US008935126B2

(12) United States Patent
Armstrong et al.

(10) Patent No.: US 8,935,126 B2
(45) Date of Patent: Jan. 13, 2015

(54) STEAM TRAP MONITORING

(75) Inventors: David M. Armstrong, Stuart, FL (US); Rex Cheskaty, Stuart, FL (US); William R. Horton, Three Rivers, MI (US); Michael H. Gaines, Kalamazoo, MI (US); Michael P. Hellman, Portage, MI (US); Lawrence J. Grubka, Vicksburg, MI (US)

(73) Assignee: Armstrong International, Inc., Three Rivers, MI (US)

( * ) Notice: Subject to any disclaimer, the term of this patent is extended or adjusted under 35 U.S.C. 154(b) by 1212 days.

(21) Appl. No.: 12/646,283

(22) Filed: Dec. 23, 2009

(65) Prior Publication Data

US 2010/0153068 A1 Jun. 17, 2010

Related U.S. Application Data

(63) Continuation of application No. 11/199,042, filed on Aug. 8, 2005, now Pat. No. 7,702,484, which is a continuation-in-part of application No. 11/006,789, filed on Dec. 8, 2004, now Pat. No. 7,246,036.

(51) Int. Cl.
*G06F 11/00* (2006.01)
*F16T 1/48* (2006.01)

(52) U.S. Cl.
CPC ........................ *F16T 1/48* (2013.01)
USPC ............................ 702/188; 702/183; 137/179

(58) Field of Classification Search
CPC .................................. F16T 1/48; F01K 13/006
USPC .................................. 702/183, 188; 137/179
See application file for complete search history.

(56) References Cited

U.S. PATENT DOCUMENTS

| | | | |
|---|---|---|---|
| 4,508,135 A | 4/1985 | Schlesch | |
| 4,630,633 A | 12/1986 | Vallery | |
| 4,945,343 A * | 7/1990 | Rodriguez | 340/606 |
| 5,715,177 A | 2/1998 | Machida | |
| 5,947,145 A | 9/1999 | Schlesch | |
| 5,992,436 A | 11/1999 | Hellman | |
| 6,145,529 A * | 11/2000 | Hellman et al. | 137/1 |
| 6,424,930 B1 | 7/2002 | Wood | |
| 6,485,537 B2 | 11/2002 | Brilmaker | |
| 6,675,665 B2 | 1/2004 | Blazquez Navarro | |
| 2004/0133395 A1 | 7/2004 | Ding | |

FOREIGN PATENT DOCUMENTS

GB       2189321       10/1987

OTHER PUBLICATIONS

Jeya M . Chandra, Chapter 8 Process Control: Statistical Quality Control, 2001, CRC Press pp. 1-8.*

(Continued)

*Primary Examiner* — Jonathan C Teixeira Moffat
*Assistant Examiner* — Regis Betsch
(74) *Attorney, Agent, or Firm* — MacMillan, Sobanski & Todd, LLC

(57) ABSTRACT

An apparatus and method for monitoring the status of a steam trap include a device for sensing a process condition of the steam trap and a device for processing the sensed condition. The apparatus can include a processor positioned on a steam trap. The connection of the monitoring device to the steam trap can be to the trap itself or to an adjacent pipe or other apparatus.

15 Claims, 9 Drawing Sheets

(56) References Cited

OTHER PUBLICATIONS

"Ultrasound simplifies steam trap inspection", authored by Alan S. Bandes, dated Feb. 1, 2003 (4 pages).
"Ultrasound Technology", The Technology (1 page).
"Computerized steam trap management system for productive maintenance" TLV Vorporation, TrapMAn Model TM5/TrapManager (2 pages).
"Ultrasonic valve & steam trap inspection" Valve and steam trap application (1 page).
"SmartWatch TM RF"—a firm commitment to technical leadership in gas and steam leak detection systems (2 pages).
Staem Stories, Technical News, Product updates and application stories for the Bestobell Distributor, vol. 08, issue 01, Jul. 25, 2001.
(May 2005) Accutech, Acoustic Monitor Field Unit User Guide; 31 pages.
(Jun. 2004) Accutech, Base Radio User Manual; 29 pages.
(Apr. 2005) Accutech, Wireless Instrumentation Manager User Guide; 34 pages.
(Jul. 25, 2001) SmartWatch Continuous Leak Detection System; 13 pages.
(1999) Spirax sarco Spiratec R16C Automatic Stream Trap Monitor Operators Instructions, IM-P087-22 MI, Issue 4; 8 pages.
(2004) Spirax sarco Spiratec R16C Automatic Steam Trap Monitor TI-P087-20 MI Issue 4; 2 pages.
(2004) Spirax sarco Spiratec R16C Automatic Steam Trap Monitor Installation, Commissioning and Fault Finding Instruction, IM-P087-21 MI Issue 7; 24 pages.
(Apr. 2003) TrapMan Model TW5/TrapManager, Computerized Steam Trap Management System for Productive Maintenance; 2 pages.
(2000) Yarway, installation, operation and maintenance Yarway SmarTrap Electronic Monitor for the Series 711/7211701-F2 disc trap (standard, HP, HC, & XHC).
The International Search Report and Written opinion of the International Search Authority—PCT/US05/44539.
Office Actions and Applicants responses in related U.S. Appl. No. 11/006,789.
Office Actions from related U.S. Appl. No. 11/199,042.
Applicants responses to Office Actions in related U.S. Appl. No. 11/199,042.

* cited by examiner

STEAM TRAP MONITORING

RELATED APPLICATIONS

This application is a Continuation application of U.S. patent application Ser. No. 11/199,042, filed Aug. 8, 2005 and entitled STEAM TRAP MONITORING which is a Continuation-In-Part application of U.S. patent application Ser. No. 11/006,789, filed Dec. 8, 2004, entitled REMOTE MONITOR FOR STEAM TRAPS, now U.S. Pat. No. 7,246,036.

TECHNICAL FIELD AND INDUSTRIAL APPLICABILITY OF THE INVENTION

The present invention relates in general to steam systems including steam traps and to steam trap monitoring.

BACKGROUND OF THE INVENTION

Steam traps are items of equipment common in factories, refineries and other industrial or commercial facilities. Steam traps are installed in steam lines and act to separate (remove) condensed steam, or "condensate", from the steam without allowing the steam to escape. The separated condensate is then typically recycled back through condensate return lines to the boiler for conversion back to steam. To be effectively operating, the steam trap must generally prevent steam from escaping past the steam trap and entering the condensate return lines. If steam is allowed to pass through the steam trap into the condensate return line, the result is a loss of valuable energy and a reduction in the efficiency of the steam system.

There are several well-known types of steam traps, including inverted bucket traps, float traps, thermostatic traps and disc traps. Manufacturing facilities, refineries and large buildings often are fitted with extensive systems of steam lines for heating and for process steam. Some of these facilities can contain 1,000 or more steam traps. To promote efficient operation of the steam traps, some type of monitoring or inspection is required to detect malfunctioning traps.

In the past, several different methods of checking the condition of steam traps have been used. One system uses a battery powered probe to sense the temperature of the traps. Another system uses a battery powered probe in an inverted bucket steam trap to sense the presence of water in the trap. When the inverted bucket steam trap has water in it, the trap has a state or condition referred to as "prime". A properly operating inverted bucket trap must have a condition of prime if it is functioning properly. A requisite amount of water in the trap is indicative of proper steam trap operation. A known steam trap monitoring system includes a probe extending into a steam trap, the probe being responsive to the level of condensate in the steam trap.

Other existing steam trap systems include signal lights on the steam traps indicative of the process conditions in the traps. Such systems require visual inspection of all the steam traps in the entire manufacturing facility for proper monitoring of all the steam traps.

Another system to monitor steam traps is a hard wire system which includes physical wiring that is threaded from each of the steam traps to one or more centrally located steam trap control stations for receiving and storing data concerning the process conditions of the steam traps.

Still other methods for monitoring steam traps included the transmission and reporting of data using radio frequencies.

SUMMARY OF THE INVENTION

One particular aspect of the invention relates to a method of monitoring the status of a steam trap. The method includes sensing a process condition of the steam trap by taking multiple readings of one or more stream trap parameters, processing the multiple readings using an algorithm in a processor mounted in a steam trap monitor positioned in the vicinity of the steam trap, and transmitting a signal, based upon the processed multiple readings, indicative of the process condition of the one or more steam trap parameters.

According to this invention there is also provided a method of attaching a monitor to a steam trap to monitor the status of the steam trap. The method includes providing a steam trap having a body and a cap, with the cap being attached to the body with at least one fastening mechanism which secures the cap to the body of the steam trap, removing the fastening mechanism, and securing a monitor to the cap with a connector device that replaces the fastening mechanism.

According to this invention there is also provided a method of monitoring the status of a steam trap, including adding a monitor mount to the steam trap, securing a probe member to the monitor mount, and sensing a process condition of the steam trap by taking multiple readings of one or more stream trap parameters with the probe member.

According to this invention there is also provided apparatus for monitoring the status of a steam trap. The apparatus includes a monitor for sensing process conditions of the steam trap by taking multiple readings of one or more steam trap parameters. The monitor is positioned in the vicinity of the steam trap. The apparatus includes a processor configured to process the multiple readings using an algorithm, the processor being mounted in the steam trap monitor. The apparatus further includes a transmitter for transmitting a signal indicative of the process conditions determined by the processor.

According to this invention there is also provided apparatus for monitoring the status of a steam trap. The apparatus includes a monitor for sensing process conditions of the steam trap by taking multiple readings of one or more steam trap parameters. The monitor is positioned in the vicinity of the steam trap. The apparatus includes a processor configured to process the multiple readings using an algorithm, the processor being mounted in the steam trap monitor. The apparatus further includes a transmitter for transmitting a signal indicative of the process conditions determined by the processor.

According to this invention there is also provided a monitoring system for a steam trap, the monitoring system including a sensor device for sensing a process condition of a steam trap, an electronic monitoring device operatively connected to the sensor device to receive data from the sensor device, and a monitor mount configured to be connectable to the steam trap and operable to convey a parameter of a steam trap to either the sensor device or the electronic monitoring device.

DETAILED DESCRIPTION OF THE INVENTION

Steam traps are automatic mechanical valves that discharge condensate (water) from a steam system. In a live steam system, if a steam trap fails to function properly, there are two possible failures: 1) failed "open", where an automatic valve in the steam trap is continuously in the open condition allowing condensate and live steam to exit the system; or, 2) failed "closed" where the trap retains all the condensate in the system and sends such condensate back into the steam system, thereby reducing the efficiencies of the steam system and possibly damaging the process equipment.

Figure 1:
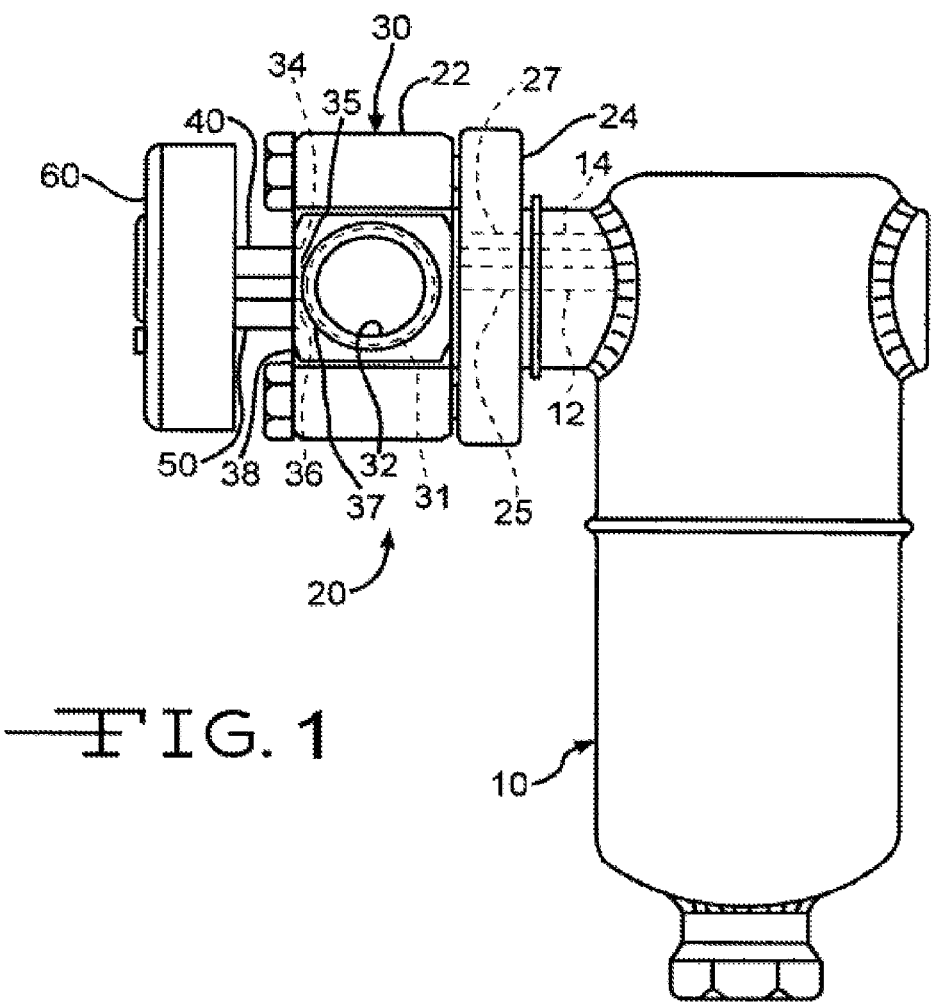
FIG. 1 is a schematic illustration, partially in phantom, of a steam trap and a remote monitoring system.

As shown in FIG. 1, one type of steam trap is generally indicated at 10. The depicted steam trap 10 is generally conventional and well known in the art, although it is to be understood that the present invention may be used with other types of steam traps. The steam trap 10 is connected to a live steam line (not shown) which supplies steam into the steam trap 10. The steam trap 10 is also connected to a condensate return line (not shown) to direct the condensate back to the steam generator, such as a boiler (not shown). The steam trap 10 is connected to a remote monitoring system 20.

In the embodiment shown, the remote monitoring system 20 includes a monitor mount in the form of a connector block 30, a temperature sensor device 40, an acoustic sensor device 50, and a monitoring device 60. As used in this description, the term "monitor mount" is intended to include, but not be limited to, any component suitable for the mounting of a monitoring device and/or sensor device and is operable to convey a parameter of a steam trap to a sensor or other device; such components may include, connector blocks (couplings or collars), adapters, mounting blocks, saddles, or any other suitable components.

It should be noted that the temperature sensor device 40 and the acoustic sensor device 50 have been rotated in FIG. 1 to give a better view of the temperature sensor device 40 and the acoustic sensor device 50.

As used in this description, the term "remote" is intended to indicate, but not be limited to, a system including a sensor where the sensor is located outside of the main body of a steam trap.

The connector block 30 allows the steam trap 10 to be installed in a piping configuration, i.e. connected to a steam line. The connector block 30 can be manufactured out of any suitable material that can withstand normal steam trap working pressures and temperatures. In certain embodiments, the connector block 30 is made of stainless steel. It is to be understood that suitable piping connections for the connector block 30 can be NPT, PSPT, socket weld, butt weld or any specialty connection that is acceptably used in the steam trap industry. In certain embodiments, the connector block 30 can have a strainer (not shown) for debris removal.

The connector block 30 is operatively connected to the steam trap 10 in a suitable manner as will be understood by those skilled in the art. In the embodiment shown, the connector block 30 includes a coupling 22 secured to a collar 24. The coupling 22 and collar 24 are in coaxial alignment with an inlet port 12 and an outlet port 14 in the steam trap 10, as in a manner understood in the art. The collar 24 includes a steam inlet passage 25 and a steam outlet passage 27.

The coupling 22 of the connector block 30 includes a steam inlet passage 31 that receives steam from the upstream steam system. The steam inlet passage 31 is in communication with the inlet passage 25 in the collar 24, which, in turn, is in communication with the inlet port 12 in the steam trap 10. The coupling 22 in the connector block 30 also includes a steam outlet passage 32 that receives recovered steam from the steam outlet passage 27 in the collar 22 of the steam trap 10 and delivers the recovered steam to the downstream steam system. As is well understood, the supply of steam is diverted into the steam trap 10 where the condensate is trapped or retained, and then removed from the system.

Figure 2:
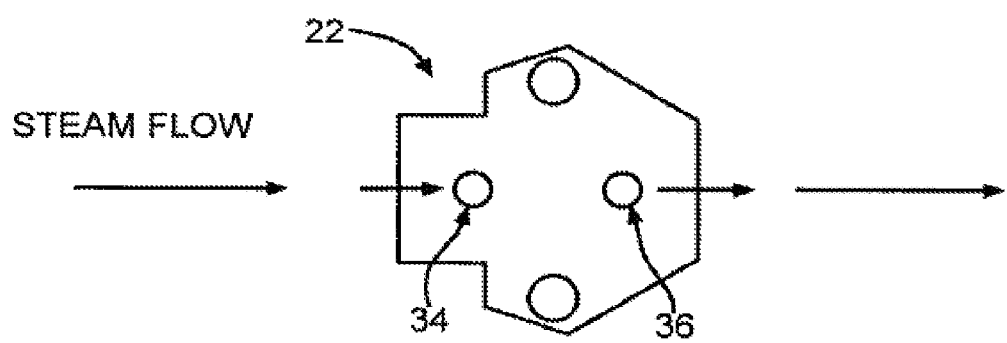
FIG. 2 is a schematic illustration showing openings for probes in a coupling of a connector block of a remote monitoring system.

In one aspect of the present invention, the connector block 30 defines a first orifice, or pocket 34 and a second orifice, or pocket 36, as shown in FIG. 2. The first and second pockets 34 and 36 each extend inward from an outer surface 36 of the connector block 30. The first and second pockets 34 and 36 terminate at closed ends 35 and 37, respectively. The closed ends 35 and 37 are in a spaced apart relationship to the inlet and outlet passages 31 and 32 in the connector block 30.

The first pocket 34 has an interior dimension that readily accepts the temperature sensor device 40. For example, the pocket 34 can be a threaded bore, as explained below, and the temperature sensor device 40 can have a correspondingly threaded bolt. The temperature sensor 40 is located within the connector block 30 in the first pocket 34 near the inlet passage 31 in the connector block 30. The temperature sensor device 40 monitors the temperature of the steam entering the steam trap 10. In an alternative embodiment, the first pocket 34 is near the outlet passage 32 and the temperature sensor 40 monitors the temperature of the steam exiting the steam trap 10.

The second pocket 36 has an interior dimension that readily accepts the acoustic sensor device 50. For example, the second pocket 36 can be a threaded bore, as explained below, and the acoustic sensor device 50 can have a correspondingly threaded bolt. The acoustical sensor device 50 is located within the connector block 30 in the second pocket 36 in a suitable manner. The acoustical sensor device 50 monitors sound emitting from the steam trap.

As shown in FIG. 1 the temperature sensor device 40 and the acoustical sensor device 50 engage the closed ends 35 and 37. In the situation where the sensor devices 40 and 50 include threaded bolts, this means that the threaded bolts of the sensor devices 40 and 50 are threaded all the way into the pockets 34 and 36 so that the end of the threaded bolt seats or directly impinges on the closed ends 35 and 37. In the case of the acoustical sensor device 50 it has been discovered that generally better acoustical results are achieved when the acoustical sensor device 50 engages the closed end 37, although such is not necessary. Alternatively, the temperature sensor device 40 and the acoustical sensor device 50 may be disposed in the first and second pockets 34 and 36 without engaging the closed ends 35 and 37.

The monitoring device 60 is operatively connected to the temperature sensor device 40 and to the acoustical sensor device 50. The monitoring device 60 receives data from the temperature sensor device 40 and the acoustic sensor device 50 and provides the monitoring logic for the individual trap 10 to which it is connected. The monitoring device 60 is thus mounted to the connector block 30 via the temperature sensor device 40 and the acoustical sensor device 50.

The monitoring device 60 can include any suitable enclosure for encasing the sensing equipment required for operation of the system. The monitoring device 60 may include any suitable programmable device capable of controlling the gathering, storage, and/or dissemination of process condition data. In certain embodiments, a suitable sensor controller is a PIC 16C22 chip from Microchip. It is to be understood that various input devices can be connected to the sensor controller to supply the sensor controller with data from the temperature sensor device 40 and from the acoustic sensor device 50. For example, electrodes (not shown) can be connected via lead lines (not shown) from the monitoring device 60 to the temperature sensor device 40 and to acoustic sensor device 50 to provide input regarding the prime status (prime or no prime) of the steam trap 10. The monitoring device 60 can be programmed to set a desired level for acceptable temperature and acoustical sensitivity.

Figures 3, 4:
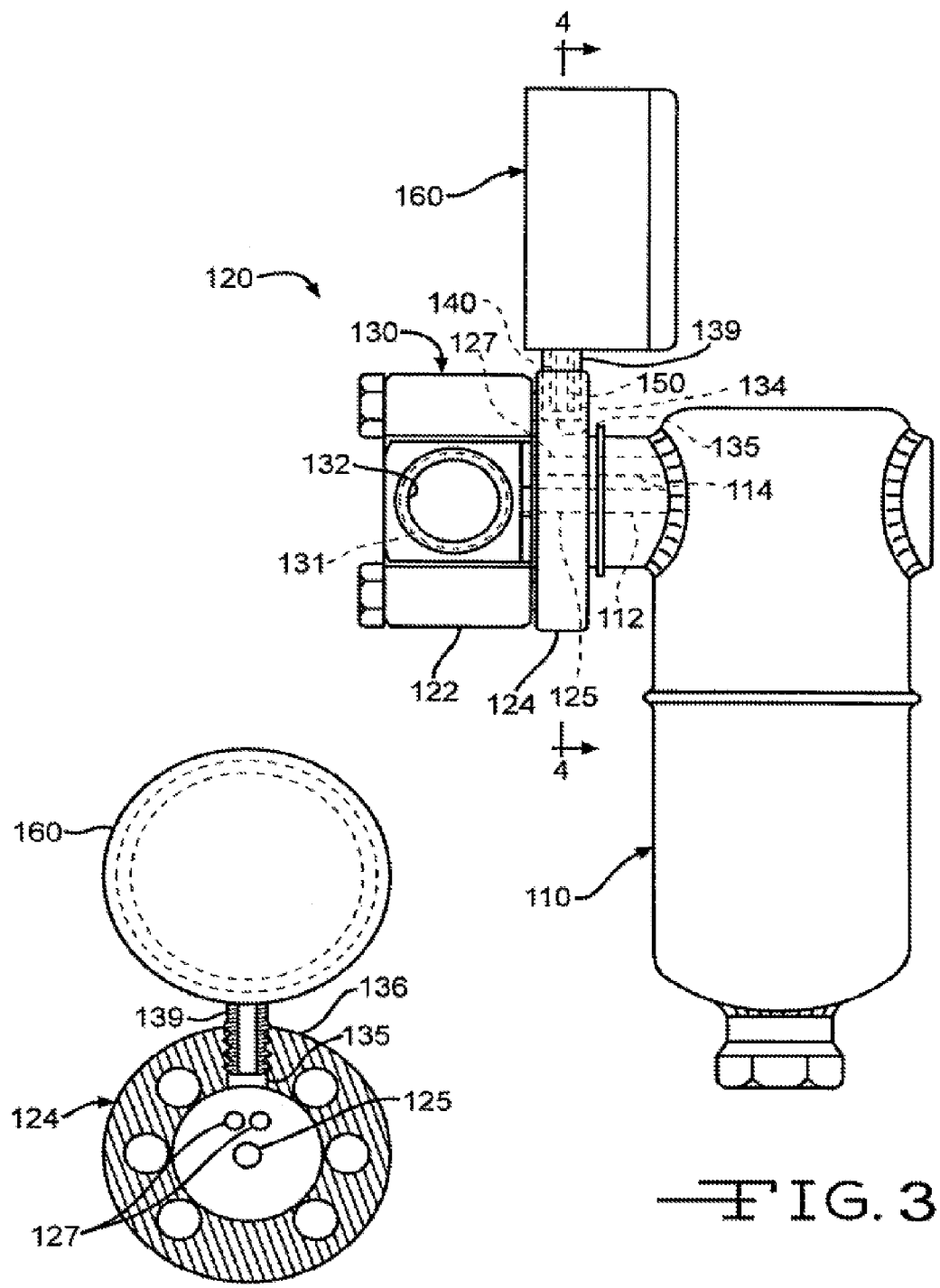
FIG. 3 is a schematic illustration, partially in phantom, of a steam trap and a retro-fittable remote monitoring system.
FIG. 4 is a schematic illustration, partially in phantom, of a portion of the retro-fittable remote monitoring system shown in FIG. 3 taken along line 4-4.

Another embodiment of the present invention relates to a remote monitoring system 120 that is especially useful for monitoring a steam trap already connected to a steam system. Referring now to FIGS. 3 and 4, a steam trap 110 is connected to a connector block 130, with the connector block 130 being suitable to act as a monitor mount. The remote monitoring system 120 can be installed between the steam trap 110 and an already hard piped connector block 130. The remote monitoring device 120 provides a cost effective and technologically advanced monitoring system for existing trap populations.

In the embodiment shown in FIGS. 3 and 4, the connector block 130 is operatively connected to the steam system in a suitable manner as will be understood by those skilled in the art. The connector block 130 includes a coupling 122 secured to a collar 124. The coupling 122 and collar 124 (the monitor mount) are in general coaxial alignment with either an inlet port 112 or an outlet port 114 in the steam trap 110, in a manner understood in the art. The collar 124 includes a steam inlet passage 125 and a steam outlet passage 127.

The coupling 122 of the connector block 130 includes a steam inlet passage 131 that receives steam from the upstream steam system. The steam inlet passage 131 is in communication with the inlet passage 125 in the collar 124, which is, in turn, in communication with the inlet port 112 in the steam trap 110. The connector block 130 also includes a steam outlet passage 132 that receives recovered steam from the steam outlet passage 127 in the collar 122 of the steam trap 110 and delivers the recovered steam to the downstream steam system. As is well understood, the supply of steam is diverted into the steam trap 110 where condensate is trapped and removed from the system.

The collar 124 of the connector block 130 defines a first orifice, or pocket, 134 which extends radially inward from an outer surface 136 of the collar 124. The first pocket 134 terminates at a closed end 135. The closed end 135 is in a spaced apart relationship to the inlet passage 131 and the outlet passage 132 in the connector block 130.

The first pocket 134 has an interior dimension that readily accepts a probe 139. As shown in FIG. 4, the first pocket 134 is a threaded bore engaging threads on the exterior of the probe 139. It must be understood however, that the probe 139 may be secured in the first pocket 134 in any suitable manner. The probe 139 can include a temperature sensor 140 and/or an acoustic sensor 150. As shown, the probe 139 is located within the first pocket 134 near the outlet passageway 127 in the connector block 130. Thus, the temperature sensor device 140 within the probe 139 may monitor the temperature of the steam exiting the steam trap 110. Likewise, the acoustical sensor device 150 within the probe 139 monitors sound emitting from the steam trap 110. Alternatively, the probe 139 may be located near the inlet passageway 125 and the temperature sensor would thus monitor the temperature of the steam entering the steam trap 110.

The probe 139 is operatively connected to a monitoring device 160 in such a manner that the monitoring device 160 receives data from the temperature sensor device 140 and the acoustic sensor device 150 and provides the monitoring logic for the individual trap 110 to which it is connected.

Figure 5:
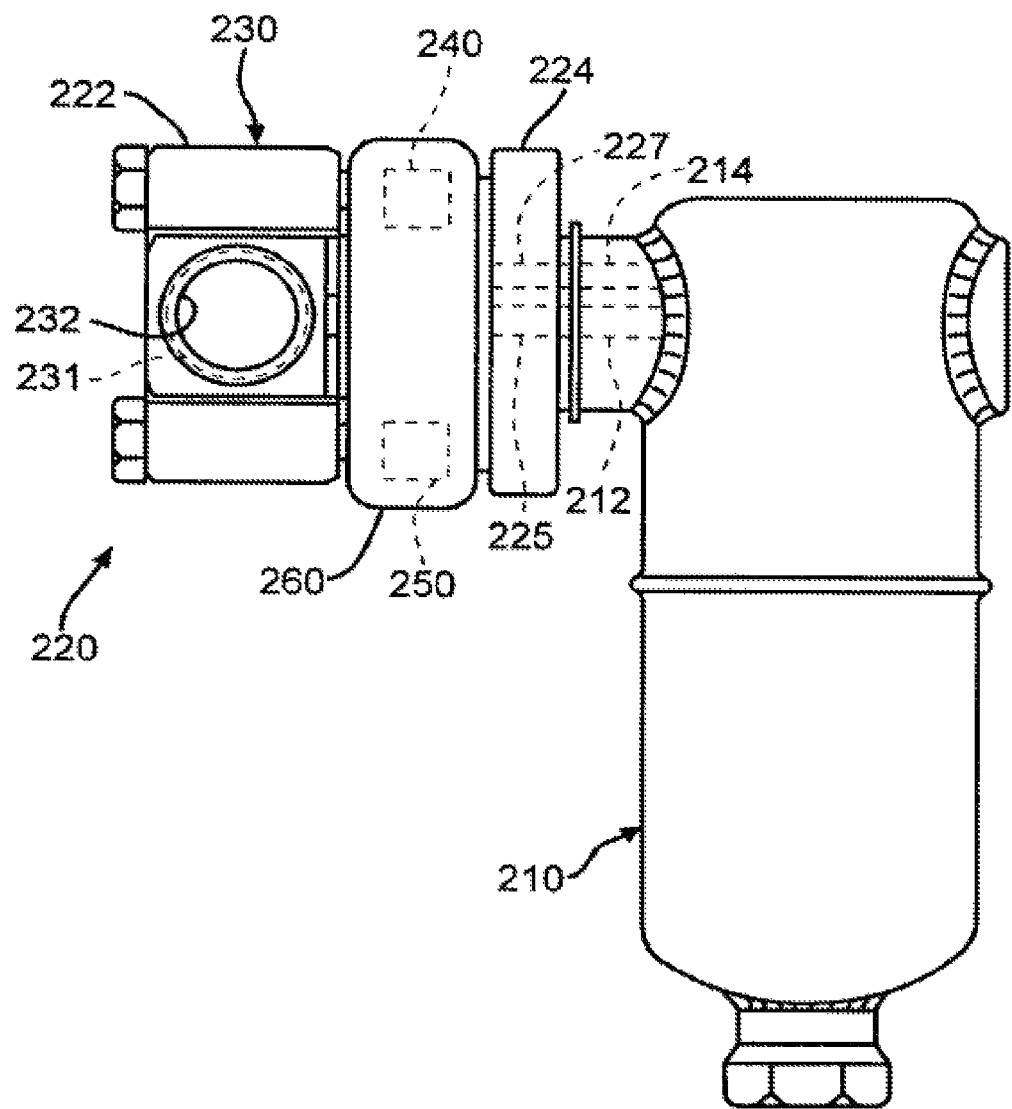
FIG. 5 is a schematic illustration, partially in phantom, of a steam trap and another embodiment of a retro-fittable remote monitoring system.

Another embodiment of the present invention relates to a remote monitoring system 220 that is especially useful for monitoring a steam trap already connected to a steam system. Referring now to FIG. 5, a steam trap 210 is connected to a connector block 230, where the connector block 230 is suitable to operate as a monitor mount, which means that the connector block 230 is operable to convey a parameter of a steam trap to either the sensor device or the electronic monitoring device.

In the embodiment shown in FIG. 5, the connector block 230 is operatively connected to the steam system in a suitable manner as will be understood by those skilled in the art. The connector block 230 includes a coupling 222 that is in a spaced apart relationship to a collar 224. The coupling 222 and collar 224 are in general coaxial alignment with either an inlet port 212 or an outlet port 214 in the steam trap 210, as in a manner understood in the art. The collar 222 includes a steam inlet passage 225 and a steam outlet passage 227.

The coupling 222 of the connector block 230 includes a steam inlet passage 231 that receives steam from the upstream steam system. The steam inlet passage 231 is in communication with the inlet passage 225 in the collar 224, which is, in turn, in communication with the inlet port 212 in the steam trap 210. The coupling 222 of the connector block 230 also includes a steam outlet passage 232 that receives recovered steam from the steam outlet passage 227 in the collar 222 of the steam trap 210 and delivers the recovered steam to the downstream steam system. As is well understood, the supply of steam is diverted into the steam trap 210 where condensate is trapped and removed from the system.

A monitoring device 260 is generally coaxially positioned between the coupling 222 and the collar 224. The electronic monitoring device 260 can include a temperature sensor 240 and/or an acoustic sensor 250. The temperature sensor device 240 monitors the temperature of the steam entering the steam trap 210. Likewise, the acoustical sensor device 250 monitors sound emitting from the steam trap 210 during the service life of the steam trap 210.

As shown in FIG. 5, the monitoring device 260 is installed in the connector block 230, e.g. disposed between the coupling 222 and the collar 224. It must be understood, however, that the monitoring device 260 can be installed in any suitable location, such as between the steam trap 210 and an already hard piped connector block 230, e.g. between the steam trap 210 and the collar 224, or between the connector block 230 and a steam pipe (not shown).

The remote monitoring device 220 provides a cost effective and technologically advanced monitoring system for existing trap populations, and therefore the ability to add the remote monitoring system in a retrofit situation is highly beneficial.

The temperature sensor 240 and the acoustic sensor 250 are operatively connected to the monitoring device 260 in such a manner that the monitoring device 260 receives data from the temperature sensor device 240 and the acoustic sensor device 250, and provides the monitoring logic for the individual trap 210 to which it is connected.

One or more other input devices for monitoring parameters associated with process conditions can be included in the connector block. Such an input device can be, for example, a pressure switch that is connected to the sensor controller in a suitable manner. Any suitable connection can be used. The pressure switch senses the pressure within the steam line, and this information is supplied to the sensor controller. Pressure switches are well known to those skilled in the art of steam process instrumentation. In addition to the process condition sensing devices described above (pressure, temperature and prime), other sensors, not shown, could be employed to sense other process conditions.

The system also optionally includes a method by which the electronic circuitry of the monitoring device is programmed to learn the individual operational characteristics of the individual steam trap connected to the connector block. The method includes monitoring tolerance levels to establish an upper tolerance level and a lower tolerance level that represent acceptable operational sound or acoustic levels for the specific type and application of the individual trap.

The method also optionally includes monitoring minimum temperatures within the steam trap to check for proper operational temperatures. The checks, or queries, are made on a regular basis to minimize energy loss in the event of steam trap malfunction. During the query, comparisons of actual sound levels are made to the sound levels created by the steam trap during the initial set-up. If the acoustical comparison is within the upper and lower limits of the baseline sounds, the query stops and a new query is initiated again per a predetermined schedule.

If the operational sound levels collected during a query are outside the upper or lower limits, an accelerated query schedule is conducted. If the queries consistently exceed the upper or lower sound limits, the steam trap is identified as a maintenance item.

The temperature sensor will sense if the steam temperature has reached a minimum temperature of 212° F. (normal minimum for steam to be present at atmospheric pressure). The temperature sensor senses hot (>212° F.) or cold (<212° F.) and relays that data to the monitoring device. This data, in turn, is used to determine if the trap connected to the connector block is located on an active (live) steam line. The monitoring device obtains data from the temperature sensor and acoustic sensor and transmits such data to a receiver (not shown) connected to a base computer (not shown). This information, once reported to the base computer, can be automatically accessed via the Internet for offsite remote monitoring. This information can be transmitted at set intervals to maintain efficiencies in the steam system.

In certain embodiments, the present invention includes monitoring the status where the averaged signals transmitted from the steam traps are transmitted periodically, and the transmitters emit signals of differing frequency to provide diversity. In certain systems, the method includes taking a predetermined number of readings (in certain embodiments, at least 4 readings) to calculate the average of the process condition of the steam trap. Also, the period of time between successive averaging of sensing process condition can be any suitable time period, such as, for example, within the range of from about 0.2 to about 5 seconds, and the period between successive steps of transmitting signals to the receiver can be any suitable range, such as, for example, within the range of from about 0.5 to about 300 seconds. Other periods can also be used. The system can be optionally set up so that the transmitter periodically transmits a signal indicative of the process condition to the receiver when the sensed process condition is within programmed limits, but where the signal from the transmitter is transmitted to the receiver immediately upon detection of a condition outside the programmed limits.

It is to be understood that the transmission and reporting of data via radio frequency systems can be conducted using technology understood in the art. In certain embodiments, a transmitter microprocessor and a microprocessor-based radio frequency transmitter are positioned within the electronic monitoring device. The transmitter microprocessor receives input from the sensor controller. The transmitter transmits an appropriate radio frequency (RF) signal responsive to the sensed process conditions. The transmitter microprocessor can be any suitable device that is programmable and is capable of receiving the output from the sensor controller. A suitable transmitter microprocessor is a model 68HC05 microprocessor by Motorola. The transmitter can be any suitable device for transmitting an appropriate radio frequency signal (or there type of signal) responsive to the condition of the steam trap. A preferred transmitter is a model FA 210 universal transmitter by Inovonics Corporation, Boulder, Colo. It is to be understood that a single programmable microprocessor can be used to control both the sensing and transmitting functions.

Also, optionally a battery can be provided within the electronic monitoring device to provide power to the components within the monitoring device. Any suitably sized battery, such as a 3-volt battery, can be used. The programmable sensor controller and the programmable transmitter can be programmed to operate periodically but for only short periods of time, so that current is drawn from the battery for only periods of short duration. This method greatly prolongs the life of the battery, thereby lengthening the time before servicing the steam trap monitoring system is required. Preferably, the monitoring system is a send only system, capable of sending signals but not receiving signals. To receive signals, the monitor would have to be fitted with a receiver that would have to be activated or powered either continuously, or periodically, thereby causing an additional drain on the battery, and shortening the service life of the battery. By designing the steam traps to have no means for receiving signals from a separate signaling device, such as a remote transmitter, the efficiency of the system is enhanced. It is to be understood, however, that the monitors could also be provided with receivers, not shown.

In operation, the monitoring system of the invention transmits an RF signal directed toward a receiver. The receiver can be any suitable device for picking up the RF signal. It is to be understood that the characteristics of the receiver must be matched to those of the transmitter to provide a proper communications link and optimal RF performance. A preferred receiver is an Inovonics FA403 receiver. Associated with the receiver is a data-handling device, such as a computer (not shown) for storing and displaying data from the steam trap. Preferably, the computer is adapted to provide alarms, reports or other indications when steam traps are determined to be malfunctioning.

In some installations of the monitoring system the distance between the steam trap and the receiver will be so great that the RF signal will be too weak or attenuated at the receiver for reliable data transmission. Therefore, the system can include a repeater (not shown) positioned between the steam trap and the receiver. The repeater receives the RF signal from the transmitter, amplifies the signal and rebroadcasts the signal. Suitable repeaters are commercially available from Inovonics. The repeater should also be matched to the characteristics of the transmitter and receiver to provide a working communications link. A preferred repeater is a model 525 repeaters by Inovonics. The repeater receives the signal from the steam trap monitor and re-broadcasts the signal with enough strength to reach the receiver. It is to be understood that several repeaters can be used in series to extend the length between remote steam traps and the receiver.

Another optional aspect of the monitoring system is that it can be configured so that it can remotely monitor the steam trap and learn the individual operational characteristics of the steam trap. The programmable sensor controller can be programmed with an algorithm which tests or senses various process conditions at the initial start-up and then throughout the operation of the steam trap.

In a specific embodiment of the invention, the remote monitoring system actively determines the process conditions and establishes the status of the steam traps within a period of active time, and remains inactive for a period of inactive time. The result of such process condition monitoring is a status of the steam trap within desired parameters. The status of the steam trap is then transmitted to the transmitter microprocessor.

The transmitter and programmable transmitter microprocessor operate somewhat independently of the remote monitoring system. The transmitter microprocessor is programmed to look at or sense the status of the steam trap as reported by the remote monitoring system. This sensing or sampling by the transmitter microprocessor occurs periodically, such as perhaps once every half second. The transmitter periodically transmits an RF signal indicative of the status of the steam trap. The transmitting of the RF signal can be accomplished with a period different from the period of the sampling by the transmitter microprocessor. Preferably, the period between successive steps of transmitting signals to the receiver is within the range of from about 0.5 to about 300 seconds. However, upon detection of a condition outside the programmed limits, the signal from the transmitter is transmitted to the receiver immediately.

Figure 6:
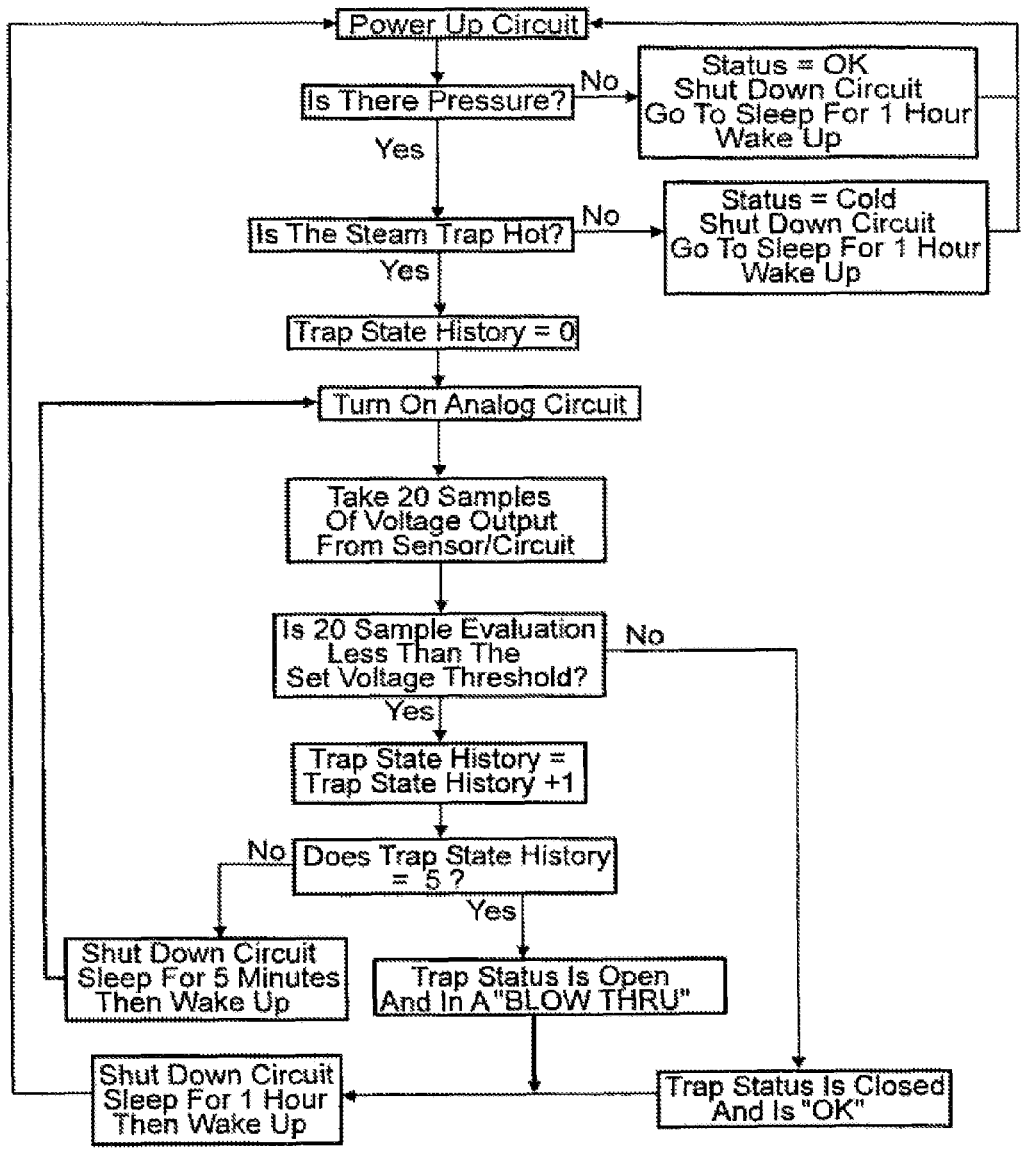
FIG. 6 shows a flow diagram of the operating algorithm of the remote monitoring system.
Figure 7:
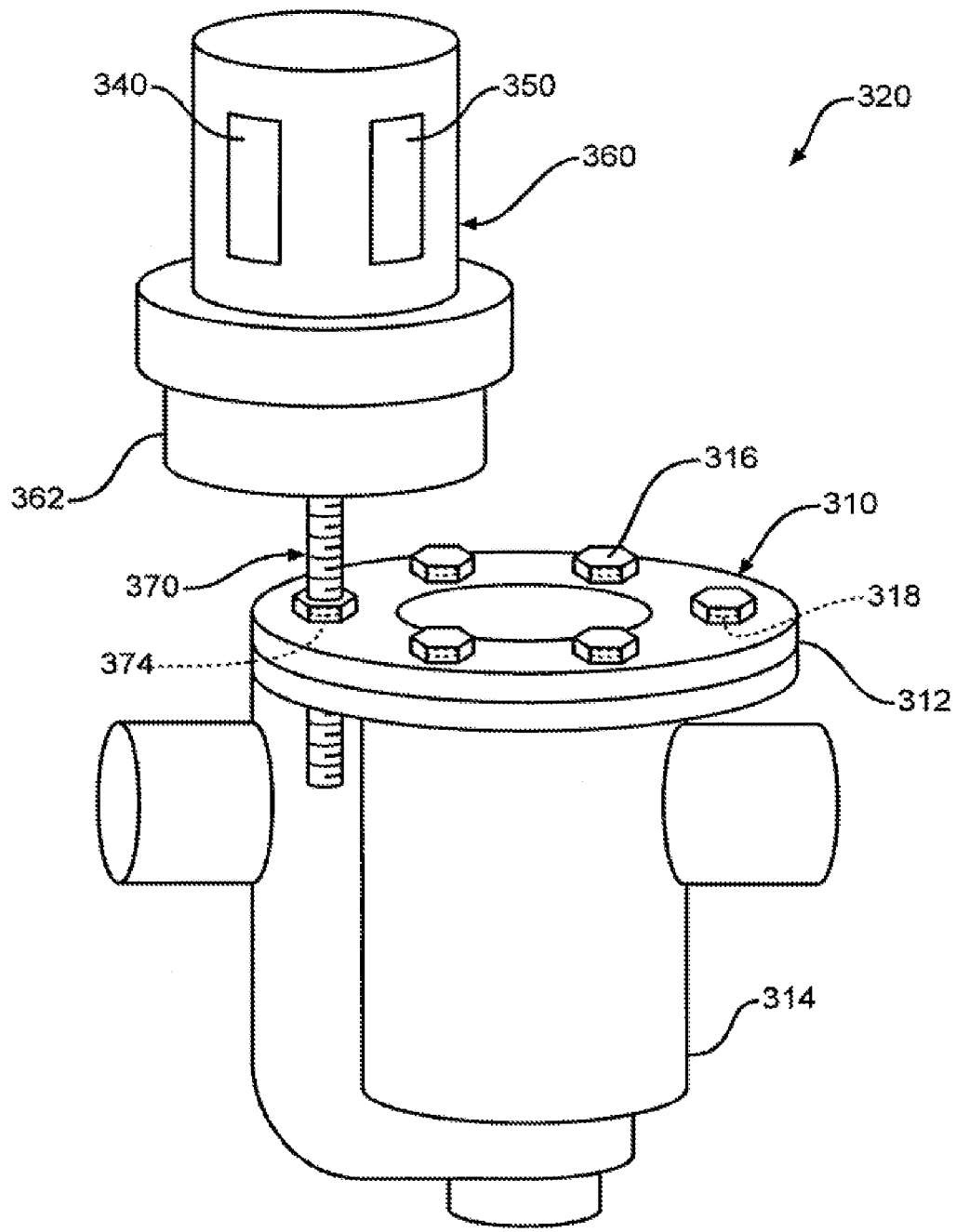
FIG. 7 is a schematic perspective illustration, partially in phantom, of a steam trap and another embodiment of a retro-fittable remote monitoring system.

One suitable operating algorithm is shown in FIG. 6. It is to be understood that different algorithms could be used to operate the system of the invention. At start-up the circuit is powered up, and a sensor makes a determination of whether there is pressure in the steam line adjacent the steam trap. If not, the status is OK, and the system is programmed to go to sleep for a period of time, such as, for example, 1 hour, before waking up. If the steam line is pressurized, another sensor makes a determination of whether the steam trap is hot. This can be determined in any number of ways, such as if the temperature of the steam trap exceeds a specific threshold temperature. If the steam trap is not hot, the status is COLD, and the system is programmed to go to sleep for a period of time, such as, for example, 1 hour, before waking up.

If the steam line is pressurized and the steam trap is hot, then the Trap State History counter is set at an initial value of zero, and the Analog Circuit is switched on. Multiple readings or samples are taken of one or more parameters, such as the condensate level or acoustical condition of the steam trap. For example, 20 samples of voltage output from a sensor or circuit associated with the condensate level or acoustical condition, or any other parameter of the steam trap, can be sampled. Any number of samples can be taken in a series or group of samples. These can be taken rapidly, such as one each 5 ms, or at any other interval.

In one particular embodiment, the algorithm is configured to determine whether or not a predetermined percentage of the samples exceeds a threshold percentage. For example, the algorithm may be configured to determine if 25 percent or more of the samples have voltage values that are less than specified voltage, with the specified voltage being indicative that the steam trap is open. If less than a predetermined percentage of sample readings (for example, less than 25 percent of the sample readings) have a voltage less than the specified voltage, then the system indicates that the Trap Status is CLOSED, and the trap is OK. In that case, the circuit is shut down for one hour, at which time the Analog Circuit is turned on and more samples are taken.

If, on the other hand, the predetermined percentage of sample readings (for example, 25 percent of the readings) have a voltage that is below the specified voltage, then there is an indication that the steam trap may be compromised. In that case, the Trap State History counter is indexed by one increment. If the resulting Trap State History counter has a value that is less than 5, that means that there have not been 5 indications of trap failure, and consequently there is insufficient evidence that the trap is compromised. Accordingly, the system is shut down for a period of time, such as 5 minutes, and then the Analog Circuit is turned on and the sequence is repeated, with more samples being taken.

If the resulting Trap State History counter has a value of 5, that means that there have been 5 indications of trap failure, and there is now sufficient evidence that the trap is compromised. Accordingly, the trap has been open too long, and the trap is in a BLOW THROUGH condition, and an appropriate signal is transmitted.

Figure 9:
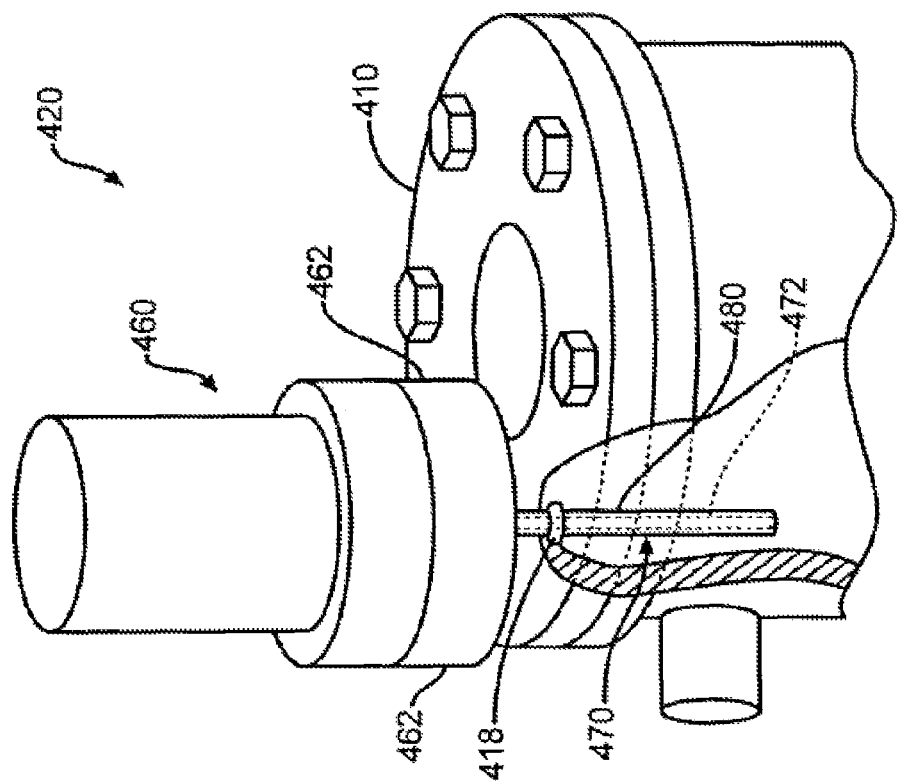
FIG. 9 is a schematic perspective illustration of another retro-fittable monitoring system for use with a steam trap.
Figure 8:
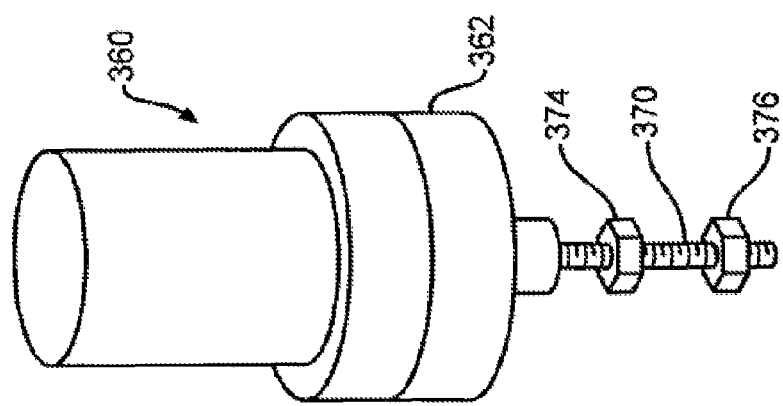
FIG. 8 is a schematic perspective illustration of the retro-fittable remote monitoring system of FIG. 8.
Figure 10:
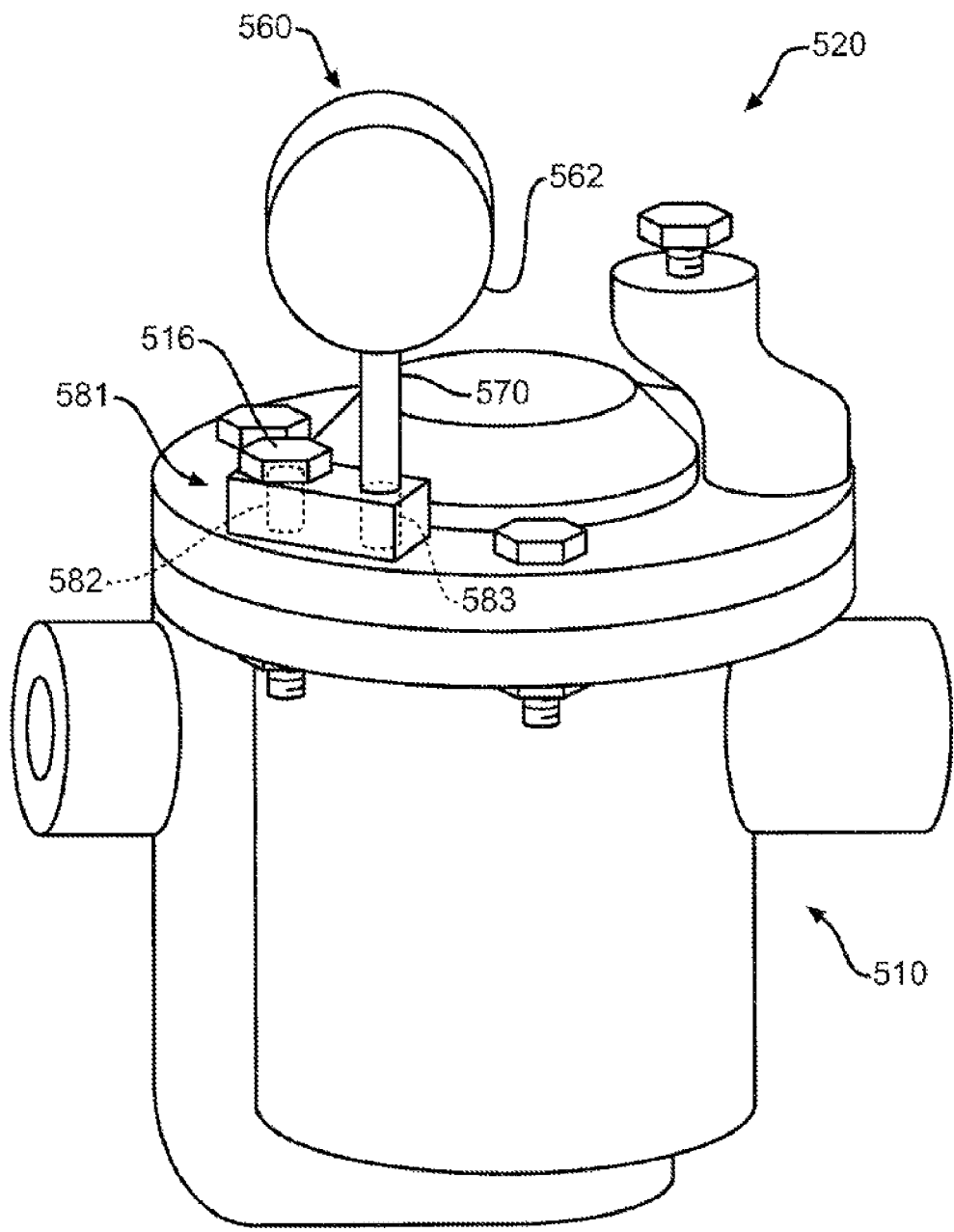
FIG. 10 is a schematic perspective illustration of another embodiment of a steam trap monitoring system.

In another aspect, as shown in FIGS. 8-10, the present invention relates to a retrofittable remote monitoring system 320 that is especially useful for monitoring a steam trap already connected to a steam system. The retrofittable remote monitoring system 320 provides a cost effective and technologically advanced monitoring system for use on existing trap populations. While FIGS. 8 and 10 show an inverted bucket type of steam trap, it should be understood that it is also within the contemplated scope of the present invention that the retrofittable remote monitoring system can be installed on other types of steam traps.

In another aspect, the present invention relates to a method for retrofitting a steam trap with a remote monitoring system.

Referring now to FIG. 8, a steam trap 310 is connected to a live steam line (not shown) which supplies steam into the steam trap 310. The steam trap 310 is also connected to a condensate return line (not shown) to direct the condensate back to the steam generator, such as a boiler (not shown). The steam trap 310 includes a cap 312 and a body 314. The cap 312 of the steam trap 310 is secured to the body 314 with one, and often a plurality of fastening mechanisms, such as a bolt 316. The cap 312 generally defines one or more openings 318, each of which receives a corresponding fastening mechanism 316.

A monitoring device 360 is operatively connected to the steam trap 310 by means of one or more connector devices. One example of a connector device is a probe member 370 that senses or relays one or more process conditions associated with or within the steam trap 310. The probe member 370 is operatively connected to monitoring devices such as a temperature monitor or sensor device 340 or an acoustic monitor or sensor device 350 within or associated with the monitoring device 360. The temperature monitor 340 monitors the temperature of the steam entering the steam trap 310 via the probe member 370. Likewise, the acoustical monitor 350 monitors sound emitting from the steam trap 310 via the probe 370.

The temperature monitor 340 and the acoustic monitor 350 are operatively connected within the monitoring device 360 in such a manner that the monitoring device 360 receives data from the temperature sensor device 340 and the acoustic sensor device 350. Further, the monitoring device 360 may provide the monitoring logic for the individual trap 310 to which it is connected.

In the embodiment shown in FIGS. 8 and 9, the probe member 370 senses one or more process conditions within the steam trap 310. The probe member 370 extends from a housing 362 of the monitoring device 360 and into the cap 312 and the body 314 of the steam trap 310. The probe member 370 is preferably made of a material that is capable of conducting temperature and/or acoustic changes within the steam trap. Suitable materials include, for example, heat and sound conducting metals and the like. It is to be understood that in its simplest form the connector device and the probe itself can be merely a threaded bolt that connects the monitoring device 360 with the steam trap.

The probe member 370 can be secured to the cap 312 by one or more securing mechanisms, shown as an upper securing mechanism 374 and a lower securing mechanism 376, which are shown as nuts. However, it must be understood that the securing mechanism may be any suitable securing mechanism, such as rivets, welds, or a clinched arrangement. The probe member 370 is operatively connected to the temperature sensor 340 and/or the acoustic sensor 350.

In one embodiment, the monitoring device 360 is connected to the steam trap 310 as follows. A fastener 316 is removed from one of the openings 318 in the cap 312. A connector device, in the form of the probe member 370 or any other suitable connector device, is then inserted into the empty opening 318. In certain embodiments, the probe member 370 can have a threaded configuration such that the monitoring device 360 can be screwed into the cap and/or body of the steam trap and no steam is allowed to escape from the steam trap 310. It is to be understood, however, that other means for preventing the loss of steam from the steam trap 310 through the opening 318 are within the contemplated scope of the present invention. The probe member 370 is positioned within the opening 318 in the cap 312 such that the probe member 370 remains at a desired depth within the steam trap 310 once the cap 312 is again secured to the body 314. In the embodiments shown, the upper securing mechanism 374 is secured against a top surface of the cap 312 and the lower securing mechanism 376 is secured against a bottom surface of the cap 312.

In another aspect, the present invention relates to a method of monitoring the status of a steam trap. The fastening mechanism 316 of either an existing or a new steam trap is replaced with a connector device. The connector device connects the steam trap with a monitor to monitor a process condition within the steam trap. Alternatively, the connector device can be a probe member 370 that is secured to the steam trap such that a portion of the probe member 370 extends through the cap and into the body of the steam trap, thus not being a remote monitor. One or more process conditions in the steam trap are sensed with the probe member 370. A signal responsive to the sensed process condition of the steam trap is then transmitted. The method can also include transmitting averaged signals from the steam trap.

In another embodiment, as shown in FIG. 10, an apparatus 420 for monitoring the status of the steam trap includes a monitoring device 460 operatively attached to a steam trap 410. The embodiment shown in FIG. 10 shows several features that can be used alone or in combination, and such uses of the feature or multiple features are within the contemplated scope of the present invention. The monitoring device 460 is directly attached to the steam trap 410. The monitoring device 460 includes one or more probe members 470 that extend from a housing 462 of the monitoring device 460. The probe member 470 acts as a temperature sensor and/or an acoustic sensor.

The probe member 470 is positioned within one opening 418 of the steam trap 410. In certain embodiments, the probe member 470 can have a threaded configuration such that no steam is allowed to escape from the steam trap 410. It is to be understood, however, that other means for preventing the loss of steam from the steam trap 410 through the opening 418 are within the contemplated scope of the present invention. The probe member 470 is positioned within the opening 418 such that the probe member 470 remains at a desired depth within the steam trap 410. In the embodiment shown, the probe member 470 can be hollow, defining an opening or passageway 472, shown in phantom in FIG. 10, to allow for the detection of pressure within the steam trap 410. In certain embodiments, a pressure sensing device 480 is positioned in the opening to sense pressure within the steam trap 410.

Figure 11:
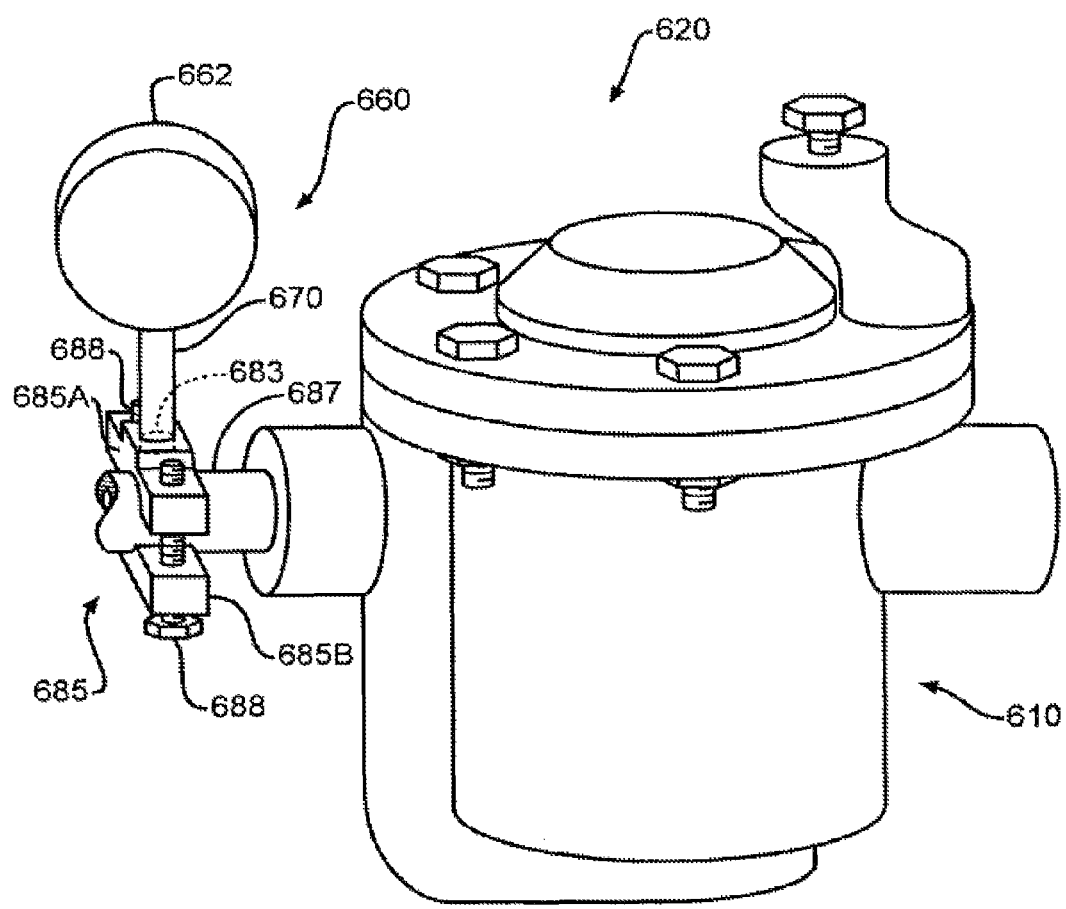
FIG. 11 is a schematic perspective illustration of another embodiment of a steam trap monitoring system.

In yet another embodiment, as shown in FIG. 11, an apparatus 520 for monitoring the status of a steam trap includes a monitor mount. The monitor mount may be any component suitable for the mounting of a monitoring device and/or sensor to a steam trap. The monitor mount is operable to convey a parameter of a steam trap to the sensor or other monitoring device. The monitor mount is shown in the form of a mounting block 581, although other forms are possible.

The apparatus 520 for monitoring the status of a steam trap includes a monitoring device 560 operatively attached to the mounting block 581. The monitoring device 560 may include one or more probe members 570 that extend from a housing 562 of the monitoring device 560. The probe member 570 acts as a temperature sensor and/or an acoustic sensor. Alternatively, the probe member may act as a carrier or intermediary for a separate sensor, such as a temperature sensor and/or and acoustic sensor, to convey one or more parameters from the steam trap to the monitoring device.

The mounting block 581 includes an attachment bore 582 and a probe bore or pocket 583. The mounting block 581 is secured to a steam trap 510 by a fastener 516 through the attachment bore 582. It must be understood, however, that the mounting block need not include the attachment bore 582 or be secured by the fastener 516. The mounting block 581 may be secured to the steam trap 510 in any suitable manner, such as by riveting, by welding, or by clinching. The monitoring device 560 is connected to the mounting block 581 by a probe 570 disposed in the probe bore 583. The probe 570 may be disposed in the probe bore 583 in any suitable manner, such as by threaded engagement, by welding or by clinching.

The mounting block 581 is preferably made of a material that is capable of conveying a parameter of a steam trap, such as conducting temperature and/or vibrating acoustic changes within or associated with the steam trap 510, or any other suitable conveyance of any parameter. It must be understood, however, that the mounting block 581 may be made of any suitable material.

Figure 12:
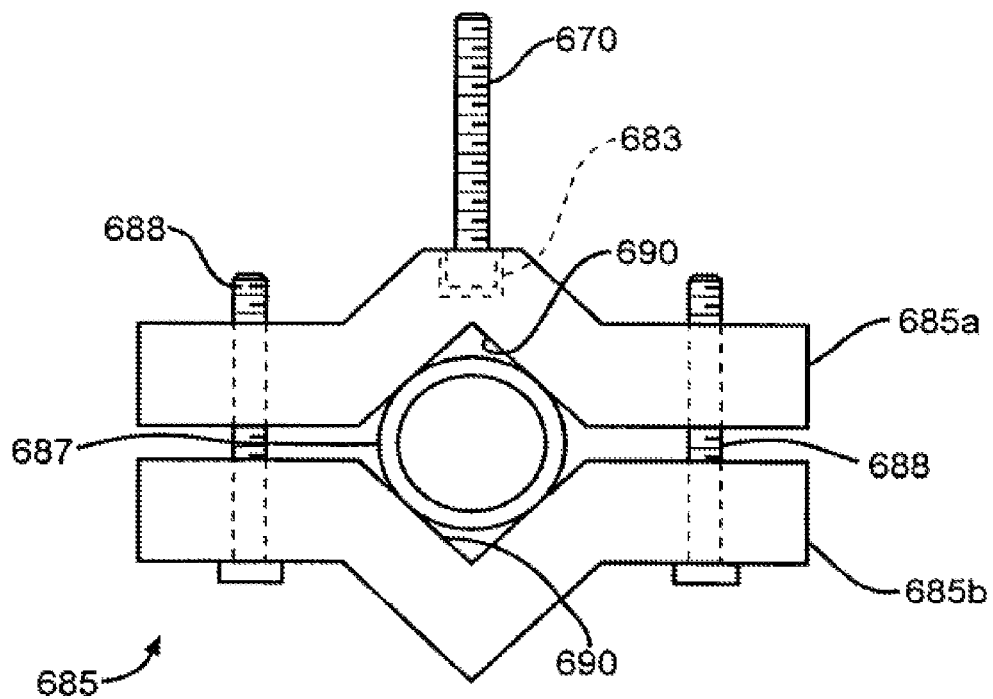
FIG. 12 is a schematic front view of the saddle of FIG. 12.
Figure 13:
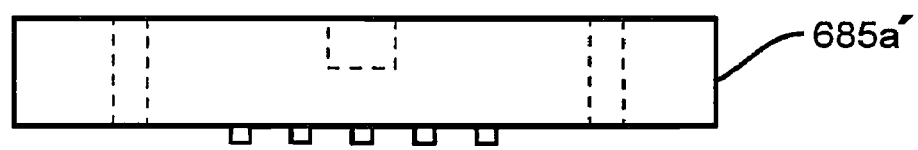
FIG. 13 is a schematic front view of a linear saddle piece without a concave surface.

In another embodiment, as shown in FIGS. 12 and 13, an apparatus 620 for monitoring the status of a steam trap 610 includes a monitoring device 660 operatively attached to a monitor mount in the form of a saddle 685. The monitoring device 660 may include one or more probe members 670 that extend from a housing 662 of the monitoring device 660. The probe member 670 acts as a temperature sensor and/or conveyor and/or an acoustic sensor and/or conveyor.

The saddle 685 is attached to a pipe 687 connected to the steam trap 610. The pipe 687 may be a steam inlet line, a steam outlet line, a condensate return line, or any other suitable pipe or mechanical member connected to the steam trap 610. It must be further understood that the saddle need not be connected to the pipe 687 and may be connected directly to the steam trap 610, or any other suitable component connected to the steam trap 610. Therefore, for purposes of this invention, the terminology "monitor mount configured to be connected to the steam trap" includes monitor mounts connected directly to the steam trap, as illustrated at 581 in FIG. 11, as well as monitor mounts connected adjacent to the steam trap via an external member, such as the saddle 685 attached to the pipe 687 or similar adjacent members (steam inlet line, a steam outlet line or a condensate return line) illustrated in FIGS. 12-13.

The saddle 685 is shown as a two piece saddle including first and second pieces 685a and 685b that are secured to the pipe 687 in a clamping arrangement by two threaded fasteners 688. It must be understood, however, that the saddle 685 need not be secured by a clamping arrangement. The saddle 685 may be secured to the pipe 687, or any other suitable component, in any suitable manner, such as by rivets, by welding, or by a clinched arrangement.

The saddle 685 includes a probe bore or pocket 683. The monitoring device 660 is connected to the saddle 685 by the probe 670 disposed in the probe bore 683. The probe 670 may be disposed in the probe bore 683 in any suitable manner, such as by threaded engagement, by welding or by clinching.

The saddle 685 is preferably made of a material that is capable of conducting temperature and/or acoustic changes within or associated with the steam trap 610, thus acting as a monitor mount. It must be understood, however, that the saddle 685 may be made of any suitable material. The saddle 685 may be suitable to be a monitor mount so long as the saddle 658 is suitable for the mounting of a monitoring device and/or sensor, and operable to convey a parameter of a steam trap to the sensor or another device.

As shown in the embodiment illustrated in FIGS. 12-13, at least one of the saddle pieces 685a and 685b optionally has a concave surface 690 to enable secure contact with the pipe 687, regardless of the diameter of the pipe 687. The surface 690 can be a pair of flat beveled surfaces, as shown, or can be semispherical, elliptical, or any other configuration enabling solid contact between the pipe 687, or other structure, and the saddle 685. A solid connection increases the thermal and acoustical conduction of the saddle 685 and ultimately for the monitoring device 660.

The face of the concave surface 690 can be smooth, or can be irregular for improved gripping and contact with the pipe 687. While both the first and second saddle pieces 685a and 685b are shown as having concave surfaces 690, the saddle 685 can be configured with only one of the saddle pieces 685a or 685b having a concave surface 690.

Further, the saddle 685 may be configured without any concave pieces. For example, the saddle 685 may alternatively include a linear saddle piece 685a', as shown in FIG. 14. The linear saddle piece 685a' includes a plurality of optional extending members for securely connecting to the pipe 687.

It can be seen from the above disclosure that in at least one of its embodiments the invention involves a method of remotely monitoring steam traps using signaling to communicate the process conditions of the steam traps to a centralized receiving station. The system for remotely monitoring a steam trap in a working, or live steam, system can include a monitoring apparatus capable of being attached to the steam trap or to a steam line. In certain aspects, the present invention is useful in new construction and/or re-piping situations where the apparatus is capable of being attached to a number of different styles of steam traps that are to be remotely monitored. In certain other aspects, the present invention is useful for installation onto existing steam traps already in place and currently being used for monitoring a live steam environment. In certain embodiments, the system includes a monitoring apparatus that adapts to an existing style of steam trap. The apparatus monitors the operational status of the steam trap and then communicates such information in a wireless transmission to a remote site.

The description of the invention above has been primarily focused on the use of temperature and acoustical sensors, such as temperature and acoustical sensors 40, 50, to sense conditions in the steam trap. It is to be understood that other sensors, such as pressure sensors, can be used to sense a condition of the steam trap. Also, when a temperature or pressure is sensed, the sensed medium can be steam, air, or water (condensate), or can be the temperature of the steam trap itself, or of a closely linked apparatus, such as adjacent piping or a connector block. Accordingly, a sensor device for sensing the temperature of the steam trap includes sensing the trap or related adjacent apparatus associated with the trap. Also, a sensor device for sensing sound emitting from the steam trap includes sensing sound from the trap or related adjacent apparatus. Likewise, a sensor device for sensing the pressure in the steam trap includes sensing the pressure in closely associated apparatus.

The principle and mode of operation of this invention have been described in its preferred embodiment. However, it should be noted that this invention may be practiced otherwise than as specifically illustrated and described without departing from the scope of the invention.

What is claimed is:

1. A method of monitoring the status of a steam trap comprising:

sensing a process condition of at least one of a temperature condition, an acoustical condition, or a pressure condition of the steam trap by taking multiple readings of one or more stream trap parameters, the process condition representing a continuum of values between an uppermost process condition limit and a lowermost process condition limit;

selecting a threshold level for the sensed process condition, the threshold level having a adjustable value between the upper process condition limit and the lower process condition limit;

processing the multiple readings using an algorithm in a processor mounted in a steam trap monitor positioned in the vicinity of the steam trap, wherein the processing includes:

a) determining if the sensed process condition exceeds the threshold level;

b) continuing to sense the process condition for a pre-determined number of readings after determining that the threshold level has been exceeded by the sensed process condition; and c) comparing the sensed process condition from each of the pre-determined number of readings to the threshold level; and d) returning to the step of sensing the process condition of the steam trap when the sensed process condition again falls below the threshold level before the pre-determined number of readings are completed; and transmitting a signal, based upon the processed multiple readings, indicative of determining one of a transient or steady state status of the process condition of the one or more steam trap parameters.

2. The method of claim 1, in which signals that are indicative that the process condition is within a programmed limit are transmitted at predetermined intervals, and in which signals that are indicative that the process condition is outside the programmed limit are transmitted immediately upon detection.

3. The method of claim 1 in which the algorithm includes determining whether or not a predetermined percentage of the readings for a parameter have values that exceed a threshold level for the sensed condition.

4. The method of claim 1, wherein when the threshold level is exceeded for each of the pre-determined number of readings, a signal is generated.

5. A method of a monitoring the operational characteristics of a steam trap comprising:
connecting a monitoring device to a specific steam trap unit;
programming the monitoring device to learn the individual operational characteristics of the specific steam trap unit;
operating the steam trap unit during an initial set up period;
sensing a process condition that is representative of the operational characteristics of the specific steam trap unit during the initial set up procedure by taking multiple readings of one or more stream trap parameters, the process condition being at least one of a temperature condition, an acoustical condition, or a pressure condition, the process condition representing a continuum of values between an uppermost process condition limit and a lowermost process condition limit;
determining an upper tolerance level and a lower tolerance level of the sensed process condition for the specific steam trap unit, the upper and lower tolerance levels being selectable values between the uppermost process condition limit and the lowermost process condition limit;
initiating a query to determine whether the process condition is one of a transient status or a steady state status process condition of the steam trap and sensing the process condition of the specific steam trap unit during operation after the initial set up period;
comparing the sensed process condition of the specific steam trap unit after the initial set up period with the upper and lower tolerance levels; and
generating a signal when the sensed process condition is outside of the upper and lower tolerance levels.

6. The method of claim 5 wherein the query is conducted on a regular basis during operation after the initial set up period.

7. The method of claim 6 wherein the regular basis of conducting queries is a predetermined schedule that is included in the programming of the monitoring device.

8. The method of claim 7 wherein a step of initiating a new query according to the predetermined schedule is taken by the monitoring device if the sensed process condition is within the upper and lower tolerance level.

9. The method of claim 5 wherein the step of comparing the sensed process condition includes determining if the sensed process condition is within the upper and lower tolerance level.

10. The method of claim 9 wherein sensing the process condition includes taking multiple readings of the process condition.

11. The method of claim 5 wherein the sensed process condition is a temperature measurement and the method includes a step of determining if the steam trap is connected to a connector block that is located on an active steam line based on the temperature measurement.

12. The method of claim 5 wherein the step of connecting a monitoring device to a specific steam trap unit includes connecting the monitoring device to a radio frequency transmitter.

13. The method of claim 12 wherein the step of comparing the sensed process condition of the specific steam trap unit after the initial set up period with the upper and lower tolerance level includes transmitting a signal, based upon the processed multiple readings, indicative of the process condition of the one or more steam trap parameters.

14. The method of claim 13 wherein the step of transmitting a signal further includes the transmitter periodically transmitting the signal indicative of the process condition to the receiver when the sensed process condition is within programmed limits and transmitting the signal to the receiver immediately upon detection of a condition outside the programmed limits.

15. The method of claim 14 wherein the receiver is connected to a base computer, and the base computer is Internet accessible.

* * * * *